Oct. 23, 1962    H. J. KAUFMAN    3,059,345
FILM DRYING CABINET
Filed July 7, 1958
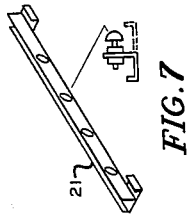
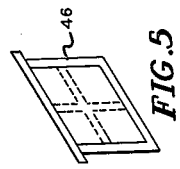
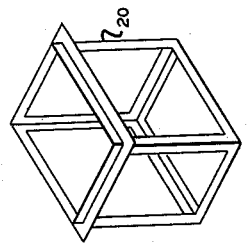
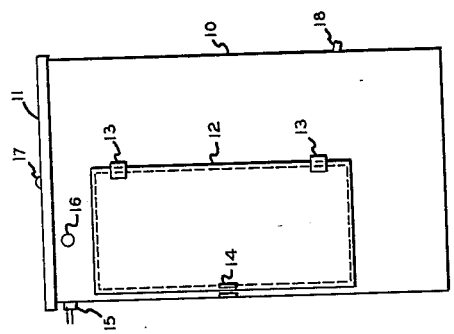
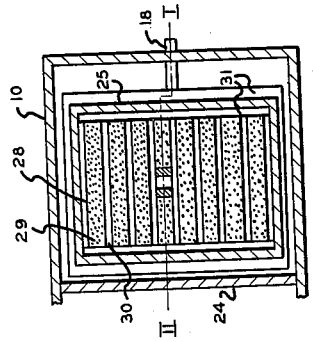
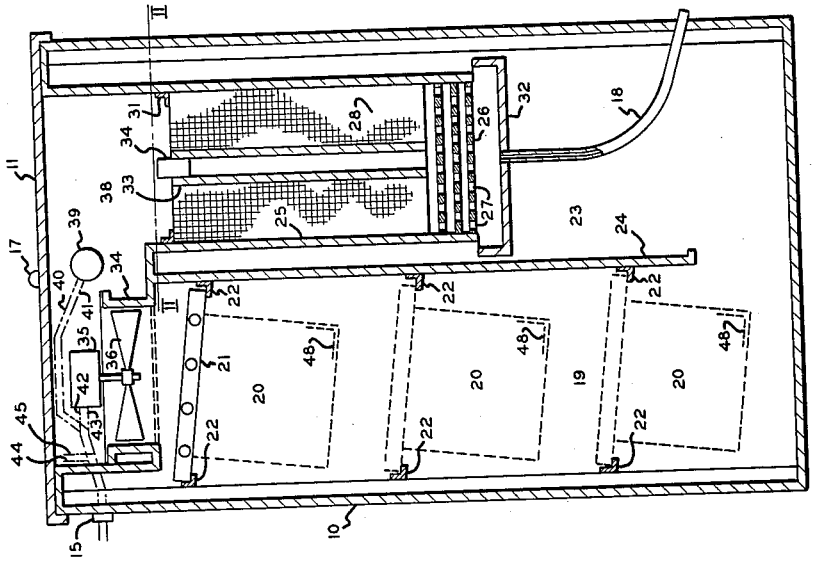
INVENTOR
HIRAM JOSEPH KAUFMAN
BY Beaman & Beaman
ATTORNEY

United States Patent Office 3,059,345
Patented Oct. 23, 1962

3,059,345
FILM DRYING CABINET
Hiram Joseph Kaufman, 13215 Roselawn Ave.,
Detroit 38, Mich.
Filed July 7, 1958, Ser. No. 746,714
2 Claims. (Cl. 34—80)

This invention relates to a method and apparatus for drying photographic films, fabrics and sheet materials with a flow of recirculated air which has been dehydrated and purified by contact with an absorbing agent such as calcium chloride, magnesium chloride or similar absorbing agent.

The films, fabrics or sheet materials are hung in racks or frames in the drying space which is preferably made accessible by opening a door at the front of the cabinet. The dehydrator section is preferably at the side of the material drying section and comprises vertical cells holding the hygroscopic agent with air passages between. Below the cells are vertically spaced trays with openings diagonally spaced over each other to permit the air to be drawn upward in counter-flow to the hygroscopic solution, formed by the melting of the solid dehydrating agent. The solution flows downwardly and drips into the collecting pan and drains away to the sewer or receptacle after the absorption of moisture from the air has increased the vapor pressure of the waste solution to equal that of the incoming air.

Soluble vapors are absorbed by the dehydrating agent and dust and solid particles are picked up mechanically by contact with the wet and sticky surfaces of the liquid dehydrating agent which are being continuously renewed by the melting of the solid dehydrating agent. This provides dust free air to contact the materials being dried, and in the case of photographic films, prevents lint or dirt or particles being deposited on the films which show on the finished photograph.

The drying action of the apparatus of the invention is faster than when heat alone is used. By the addition of heat to the recirculated air of the cabinet the rate of drying of the cabinet may be increased. In this case only the heat radiated from the cabinet is wasted, which is much less than in drying with heat only and wasting all of the heat. Heat dryers of known types have a continuous flow of air through the dryer and are more liable to deposit dust on the films than when recirculated air is purified on each circuit through the dehydrator of the present invention.

Color films should be dried at temperatures between 75° F. and 80° F. and can be dried by the present invention with very simple apparatus as compared to refrigerating and reheating with electrical energy.

In specific detail, according to the invention, air is recirculated upward through the dehydrator into the fan space at the top and blown downward directly over the films at high velocity which is an important factor in drying materials with air current. The materials to be dried are preferably hung at the top end and are not disturbed by this high velocity.

One object of the invention is to provide a method and apparatus for drying films in a closed cabinet which is independent of room atmospheric humidity conditions.

Another object of the invention is to provide a method and apparatus for drying films which is independent of room air impurity conditions.

A further object of the invention is to provide a method and apparatus for drying films which is independent of room temperature conditions.

A still further object of the invention is to provide a method and apparatus for drying films which is much lower in cost of operation than those commonly in use at present.

Recognizing that various modifications, within the scope of the invention, will be apparent to those skilled in the art, I do not intend to limit the invention to the particular embodiment described, but by way of illustration one form of the invention is presented in the specification, claims and drawing wherein, In the drawing, FIG. 1 is a vertical section of the film drying cabinet taken on line I—I of FIG. 2, FIG. 2 is a horizontal section of the dehydrator portion taken on the line II—II of FIG. 1, FIG. 3 is an elevation of the front of the cabinet showing the door to the film drying space, FIG. 4 is a drawing of a standard hanger rack for photographic films, 8" x 10", 4" x 5", 5" x 7" and smaller, FIG. 5 is a drawing of a standard hanger for 8" x 10" or 4" x 5" films, for hanging lengthwise in the hanger rack, FIG. 6 is a drawing of a standard hanger for 5" x 7" and smaller films, and FIG. 7 is a drawing of a hanger for roll films with each cabinet holding nine hangers for four rolls each.

Referring particularly to FIG. 1, the cabinet shell 10 has the top 11 and the door 12 with the hinges 13 and the latch 14, the electrical connection 15, the switch 16, the bulls-eye signal 17 and the drain connection 18.

Inside the cabinet 10 is the film drying space 19 holding three hanger racks 20 or the nine roll film hangers 21, supported on the angles 22. The dehydrator space 23 is separated from the film drying space 19 by the partition 24 and contains the dehydrator container 25 which holds the liquid dehydrator plates 26 which are of perforated metal placed vertically above each other and having drainage holes 27 staggered over each other and supporting the baskets 28 of perforated metal or wire cloth, having closed bottoms of the same material and open tops. The baskets 28 hold calcium chloride, magnesium chloride or similar hygroscopic solid material 29 and are separated from each other by the air passages 30 and are held in place by the angles 31. Underneath the liquid dehydrator plates 26 is the dilute solution collecting pan 32 and the drainage tube 18. The solid dehydrating material 29 is melted by moisture in the air drawn upward through the dehydrator over the dilute solution in the collecting pan 32, upward in a diagonal direction through the holes 27 in the plates 26 and upward through the air spaces 30 between the baskets 28 holding the solid dehydrating material 29. The tube 33 in the basket 28 has the plug or cap 34 and is to provide an open space at all times for pouring water down to the plates 26 and the collecting pan 32 to dissolve any caking of the hygroscopic material on the plates 26 or in the collecting pan 32 or the drain tube 18. The fan space and dehydrator filling space 38 in the top of the cabinet is separated from the film drying space 19 by the partition. The fan ring 34 contains the motor 35, driving the fan 36, and blows air through the grill guard 37. The fan and dehydrator filling space 38 contains an electrical socket for the electrical light or heating element 39, which is supplied with electrical current by the wires 40 and 41 through the connection 15, which supplies current to the motor 35 by the wires 42 and 43, with current to the heating element 39 and motor 35 controlled by the switch 16 through the wires 44 and 45. The bulls-eye 17 is illuminated by the light from the light bulb or heating element 39. The top of the cabinet 11 is removable for access to the fan, motor, heating element or dehydrator.

Air is drawn by the fan 36 from the film drying space 19 upward through the dehydrator 23 and blown downward between the vertically supported photographic films or sheet material at the maximum velocity in the circuit to secure the maximum drying efficiency. The air drawn upward through the dehydrator is first in contact with the dilute hygroscopic solution, second in contact with the saturated hygroscopic solution and next in contact with the hygroscopic solid to produce the driest air with the least waste of hygroscopic material by counter flow efficiency. The air is drawn from the film drying space 19 at the bottom through the opening after it has been slightly cooled by evaporation of moisture from the films and is at the lowest temperature in the circuit, which reduces the temperature of the dehydrating material and increases the absorbing capacity. Heat is added after dehydration so as not to increase the temperature of the dehydrating material and decrease the vapor absorbing capacity of the dehydrating material, which increases and decreases inversely with temperature.

The film hanger racks 20 and the film hangers 46 and 47 are supported on the angles 22 with the lower edge sloping so that the water on the surface will flow along the lower edge to the low point where the water will be collected on the fine mesh L-formed screens 48 which will allow air to pass through the screens but will collect water and hold it until evaporated by the dry air. The screens 48 can be placed inside the hanger racks 20 or supported on top of the hangers 46 and 47.

All the air is recirculated and is dehydrated and filtered in each cycle, without giving off vapor to the room or heat except by conduction through the cabinet walls.

The cabinet is portable and can be used for dehumidifying rooms by merely leaving the door open.

Having thus described my invention, what I claim as new is:

1. Hygroscopic dehydrating apparatus, comprising means for holding hygroscopic solid particles in baskets of porous material with air passages between, means for receiving and spreading saturated hygroscopic solution dripping from the said hygroscopic solid particles, means for collecting dilute hygroscopic solution dripping from the said saturated hygroscopic solution spreading means, means for draining dilute hygroscopic solution from the said apparatus and a normally closed passage defined through the said hygroscopic solid particles to the said means for spreading the said saturated hygroscopic solution for adding water to the means spreading the saturated hygroscopic solution to flush out the said saturated hygroscopic solution and the said dilute hygroscopic solution from the said apparatus to prevent crystallization and clogging and means creating an air flow through said apparatus wherein said air flow sequentially passes contiguously over said dilute hygroscopic solution, through said saturated solution spreading means and interbetween the hygroscopic solid particles.

2. Film drying apparatus comprising a film drying space containing supports for one or more tiers of hanger racks for loading and removing from the front, an air dehydrating space containing a dilute hygroscopic solution dehydrating portion, a saturated hygroscopic solution dehydrating portion and a hygroscopic solid dehydrating portion, a stack of perforated liquid distributor plates receiving and distributing said saturated hygroscopic solution, means for recirculating a flow of air contiguously over the said dilute hygroscopic solution dehydrating portion, and upwardly through the said saturated hygroscopic solution dehydrating portion and throgh said plates and the said hygroscopic solid dehydrating portion and downwardly through the said film drying space in contact in sequence with one or more tiers of film hanger racks and film hangers.

References Cited in the file of this patent

UNITED STATES PATENTS

| | | |
|---|---|---|
| 1,067,693 | Van Calcar et al. | July 15, 1913 |
| 2,479,706 | Williams | Aug. 23, 1949 |
| 2,495,612 | Trimble | Jan. 24, 1950 |
| 2,782,526 | Cota | Feb. 26, 1957 |
| 2,804,940 | Hutchinson | Sept. 3, 1957 |
| 2,831,268 | Cox | Apr. 22, 1958 |